Aug. 11, 1925.
A. H. CANDEE
1,548,929
HOB AND METHOD OF PRODUCING THE SAME
Filed March 17, 1922
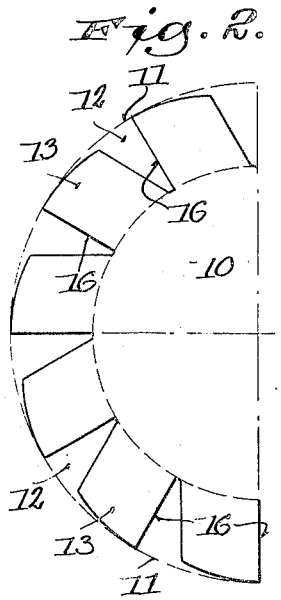
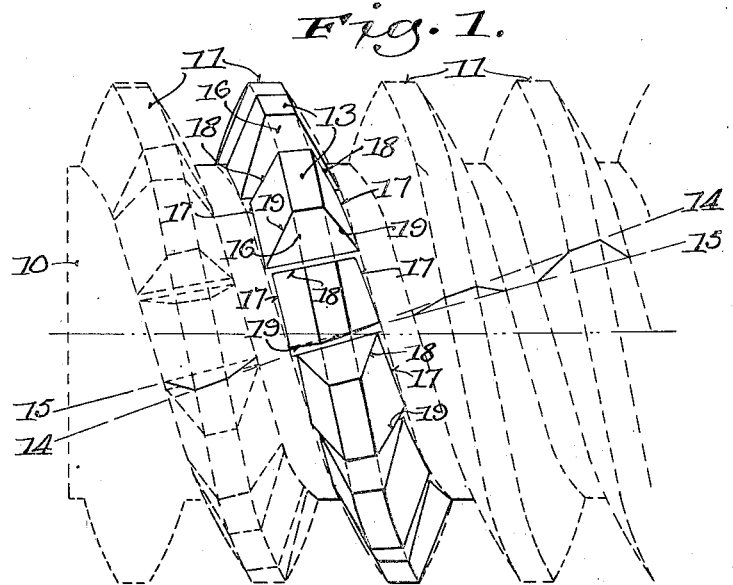
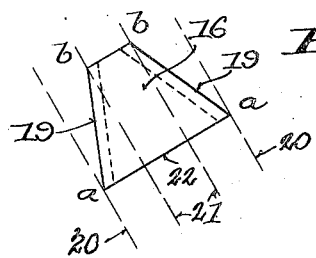
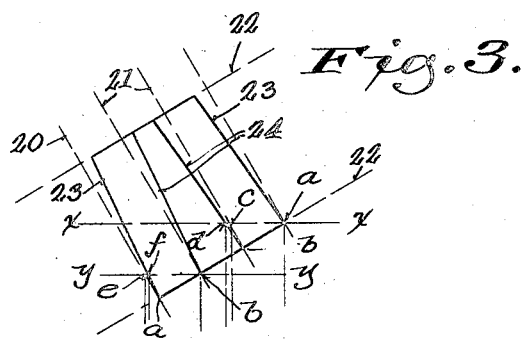
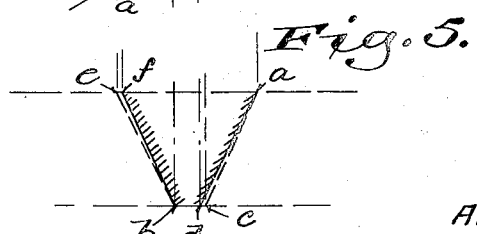
INVENTOR.
ALLAN H. CANDEE
BY
Ralph W. Brower.
ATTORNEY.

Patented Aug. 11, 1925.

1,548,929

UNITED STATES PATENT OFFICE.

ALLAN H. CANDEE, OF MILWAUKEE, WISCONSIN, ASSIGNOR TO THE FALK CORPORATION, OF MILWAUKEE, WISCONSIN, A CORPORATION OF WISCONSIN.

HOB AND METHOD OF PRODUCING THE SAME.

Application filed March 17, 1922. Serial No. 544,424.

*To all whom it may concern:*

Be it known that I, ALLAN H. CANDEE, a citizen of the United States, residing at Milwaukee, in the county of Milwaukee and State of Wisconsin, have invented a certain new and useful Improvement in Hobs and Methods of Producing the Same, of which the following is a full, clear, concise, and exact description, reference being had to the accompanying drawings, forming a part of this specification.

This invention relates to hobs for use, primarily, in cutting the teeth of gears of the spur, helical or worm types, although the novel features thereof may be employed to advantage in hobs for cutting other shapes.

Hobs for these purposes ordinarily comprise a number of cutting teeth projecting from a cylindrical base and arranged in one or more helical series extending thereabout. The teeth are usually formed as integral parts of the cylinder, although in some instances they are removably secured thereto. Integral hobs are ordinarily produced by providing a cylinder having one or more integral threads on the surface thereof and by interrupting the thread or threads at regular intervals by transverse gashes or flutes to form one or more helical series of separate projections constituting the bodies of the respective teeth. The face at the leading end of each projection thus formed contains the cutting edges of each tooth and will hereinafter be referred to as the cutting face.

In the following description, the term "lead" will be used to designate the length along the axis of a thread or helix for one revolution. The term "pressure angle" will also be employed in its usual sense with reference to gear teeth and to worm threads. With reference to hobs the term "effective pressure angle" will be used to designate the theoretical pressure angle of the imaginary helicoidal surface corresponding to the side of the original thread and containing the cutting edges of the successive hob teeth within the thread.

The lead and number of threads at a hob blank depend upon the nature or character of the work to be performed by the finished hob. In those hobs in which the lead of the threads is short the gashes or flutes often extend parallel to the axis of rotation, while in others the gashes extend spirally so as to intersect the threads substantially at right angles thereto.

In order to secure proper cutting clearance, the side faces, as well as the top face, of each tooth must be tapered off rearwardly from the cutting face. This is commonly known as backing off or relieving and is ordinarily accomplished by the use of a relieving lathe. In the lathe, the hob blank is rotated about its axis and the lathe tool, in addition to being advanced in accordance with the lead of the original thread of the hob, is intermittently shifted in such manner as to taper off the side faces of the successive teeth from the cutting edges toward the rear thereof. Usually, faces of teeth lying in one side of the original thread are first relieved in this manner, and then the tool is changed and the faces of the teeth in the other side of thread similarly relieved, although the contiguous sides of teeth in adjacent threads are sometimes relieved simultaneously by the use of a double edged tool. In either event, the two sides of a finished tooth are not parallel, and though the corresponding side cutting edges of the successive teeth lie in imaginary helicoidal surfaces, the side faces of the teeth do not coincide with such surfaces.

In forming the sides of the hob teeth in a relieving lathe the tool is usually set so that the cutting edge thereof lies in an axial plane of the hob, and, in accordance with the practice heretofore followed, this cutting edge is positioned at the same angle as the desired pressure angle of the hob. In other words, it has been the practice heretofore to make the angular position of the tool cutting edge for forming one side of a tooth an exact counterpart of the angular position of the tool cutting edge for forming the other side of the tooth, or otherwise expressed, the two tool cutting edges for forming the opposite sides of a tooth were positioned symmetrically with respect to the axis of rotation of the hob.

It has been found, however, that hobs produced in this manner, particularly those in which the gashes or flutes do not extend parallel to the axis of the hob, do not generate gear teeth having the same pressure angle on the opposite faces thereof, thus indicating that the side cutting edges of the teeth of the hob so produced are not effectively symmetrical with respect to the line of cut.

This invention is predicated upon my discovery that, particularly in spirally gashed or fluted hobs, some correction must be made in the angular positions of the cutting edges of the relieving tool to compensate for the effect of relief upon the effective pressure angles of the hob teeth, and upon my discovery that such correction can be made and determined with mathematical accuracy.

One object of the present invention is the provision of a hob, the cutting faces of the teeth of which, though not parallel to the axis of rotation, are shaped to produce a symmetrical cut.

Another object is the provision of a spirally gashed or fluted hob designed to generate gear teeth having substantially the same pressure angle on the opposite sides thereof.

Another object is the provision of a method for producing hobs having equal effective pressure angles on opposite sides of the teeth thereof.

Other objects and advantages will hereinafter appear.

One embodiment of the present invention is diagrammatically illustrated in the accompanying drawings, in which:

Figure 1 is a side elevation diagrammatically illustrating a hob embodying features of the present invention.

Figure 2 is a fragmentary sectional view of the hob of Figure 1.

Figures 3, 4 and 5 are diagrams graphically illustrating certain features of the invention.

The hob selected for illustration includes a cylindrical base 10 having a double helix or thread 11 indicated by dotted lines in Figures 1 and 2. These threads are interrupted at regular intervals by a series of spiral gashes or flutes 12 into successive spirally arranged projections 13 forming the bodies of the several cutting teeth. The lines 14 and 15 define an imaginary helicoidal surface constituting one side of one of the series of flutes or gashes, the intersection of which with each of the threads 11 forming the cutting face 16 of a hob tooth.

As above pointed out, the side faces of each projection 13, constituting the body of a tooth, are relieved to provide cutting clearance. Before relieving, these faces, of course, coincide with the sides of the original helical thread, but after relieving they assume positions as indicated by the lines 17, 18 and 19 in Figure 1. Thus it will be noted that after relieving, the body of each tooth is tapered rearwardly from the cutting face so that the side faces of each lie in helicoidal surfaces having different helical angles than the helicoidal surfaces containing the sides of the original thread.

In accordance with the present invention, this relief is accomplished in such manner that the side cutting edges 19 of each tooth, formed by the intersection of each cutting face with the relieved faces, will be so positioned as to effect a cut having symmetrical sides. In other words, the resulting cutting edges 19 of successive teeth must lie in symmetrical helicoidal surfaces. Otherwise expressed, the relieved surfaces of each tooth must be of such character as to pass through the intersection of the cutting face thereof with the required symmetrical imaginary helicoidal surfaces containing the cutting edges of the successive teeth.

In hobs in which the flutes or gashes do not extend parallel to the axis of rotation of the hob, I have found that this can be accomplished by so positioning the relieving tool or grinder as to compensate for the effect of the relief upon the position of the cutting edges of the hob teeth.

The need for such correction will be clear from an inspection of the diagram of Figure 3 in which a single tooth 20 is shown in plan projecting from a plane surface 10′ constituting in effect a development of the surface of the cylinder 10. The direction of the helical thread containing the tooth is indicated by the lines 20, 21 and the direction of the gashes or flutes by the lines 22. The lines 23, 24 indicate the planes containing the sides of the tooth after relieving. The cutting face of the tooth, of course, lies in the plane of the gash indicated by one of the lines 22.

It will be noted that each of the lines 20 intersects one of the lines 23 in a point $a$ along the line 22 and that each of the lines 21 intersects one of the lines 24 in a point $b$ along the line 22, so that each of the three planes defined by the lines 20—21, 23—24 and 22 intersects in a single line $a$—$b$ constituting the side cutting edge of the tooth.

The planes 20—21 on the opposite sides of the teeth are symmetrical, and since the side cutting edges of the teeth are contained therein, this diagram illustrates the condition which should be obtained.

In the diagram, the lines $x$—$x$ and $y$—$y$ represent axial planes of the hob normal to the surface 10′, intersecting the opposite sides of the tooth at the points $a$ and $b$, respectively, and representing the planes which ordinarily contain the edges of the lathe tool during the relieving process. It will be noted that the line $x$—$x$ intersects the lines 21 and 24 at the points $c$ and $d$ and that the line $y$—$y$ intersects the lines 20 and 23 at the points $e$ and $f$. The lines $a$—$d$ and $b$—$f$ thus indicate the correct positions of the effective cutting edges of the lathe tool to produce relieved side faces of the tooth having the correct angle. By projecting these points a, b, c, d, e and f into a plane normal to the plane of the surface 10, as in Figure 5, the angular positions of the lines a—d and b—f relative to the surface 10 are given. From an inspection of Figure 5 it will be noted that the lines a—c and b—e are exactly symmetrical with respect to the line indicating the plane 10′, but that the lines a—d and b—f are inclined in opposite directions relative to these symmetrical lines and that they are unsymmetrical relative to the plane 10′. Thus it will be seen that to obtain upon the finished tooth relieved side faces and cutting edges of the desired angular relation, it is necessary to set the cutting edges of the relieving tooth at different angular positions for the opposite sides of the tooth. In other words, to obtain a hob having the same effective pressure angle on both sides of the teeth, some correction must be made in setting the tool to compensate for the effect of the relief.

I have found that the degree of correction is dependent upon the following factors, the desired effective pressure angle, the lead of the thread helix, the lead of the gash helix, and the lead of the helix forming the relieved side of the tooth. Upon this basis, I have derived a formula by which the correct setting of the tool may be ascertained.

This formula is as follows:

$$\tan A_1 = \tan A \frac{G+T_1}{G+T}$$

in which A is the desired effective pressure angle; $A_1$ is the angle for setting the edge of the tool; G is the lead of the gash helix; T is the lead of the thread helix; and $T_1$ is the lead of the helix containing the relieved side of the tooth.

For purposes of simplicity, the lines above mentioned constituting the intersections of two or more surfaces are shown as straight lines, although in actual practice they are not necessarily straight. It will be further understood that relieving of the hob teeth has been accomplished by the use of grinders as well as lathe tools and that although reference has been repeatedly made herein to the use of lathe tools, the production of hobs, having the above novel characteristics, by the use of grinders is clearly within the province of the present invention.

It will also be understood that the outside faces of the hob teeth of the present invention are relieved to effect proper cutting action of the top cutting edges thereof, but since this relief may be accomplished in any well known manner, without affecting the present invention, no further reference need be made thereto.

I claim:

1. A spirally fluted hob having cutting teeth so relieved that the two imaginary helicoidal surfaces containing the side cutting edges of successive teeth are symmetrical.

2. A spirally fluted hob having cutting teeth so relieved that the effective pressure angles on the opposite sides thereof are equal.

3. A hob having one or more helical series of teeth each having a cutting face and relieved sides intersecting said cutting face to form cutting edges, the relieved sides of each tooth comprising unsymmetrical helicoidal surfaces, and the cutting edges on opposite sides of the successive teeth of the series lying in imaginary helicoidal surfaces which are symmetrical.

4. A hob having one or more helical series of teeth each having a cutting face comprising a helicoidal surface and relieved sides intersecting said cutting face to produce cutting edges, the relieved sides being so formed that the resulting cutting edges on the opposite sides of the successive teeth of the series lie in two imaginary helicoidal surfaces which are symmetrical.

5. A hob having one or more helical series of teeth each having a cutting face comprising a helicoidal surface and relieved sides intersecting said cutting face to produce cutting edges, the relieved sides being so formed that the resulting cutting edges of successive teeth define an imaginary thread of symmetrical form.

6. The improvement in the method of relieving the teeth of spirally fluted hobs which consists in setting the relieving tool or grinder at corrected unsymmetrical angles for the opposite sides of the teeth such that the resulting cutting edges of the teeth on opposite sides of the same thread define two imaginary helicoidal surfaces which are symmetrical.

7. The improvement in the method of relieving the teeth of spirally fluted hobs which consists in setting the relieving tool or grinder at corrected unsymmetrical angles for the opposite sides of the teeth such that the resulting cutting edges of successive teeth define an imaginary thread of symmetrical form.

8. The improvement in the method of relieving hob teeth which consists in setting the relieving tool or grinder at corrected unsymmetrical angles for the opposite sides of a tooth, the degree of such correction being dependent upon the required pressure angle, the lead of the flute or gash, the lead of the thread, and the lead of the relieved side of a tooth, so as to produce a hob having equal effective pressure angles on the opposite sides of the thread.

In witness whereof, I hereunto subscribe my name this 24th day of February, 1922.

ALLAN H. CANDEE.